US011595213B2

(12) United States Patent
Moran et al.

(10) Patent No.: US 11,595,213 B2
(45) Date of Patent: Feb. 28, 2023

(54) METHODS AND APPARATUS FOR PERFORMING ATTESTATION

(71) Applicant: Arm Cloud Technology, Inc., San Jose, CA (US)

(72) Inventors: Brendan James Moran, Histon (GB); Derek Del Miller, Austin, TX (US); Hannes Tschofenig, Cambridge (GB)

(73) Assignee: Izuma Tech, Inc., Evant, TX (US)

( * ) Notice: Subject to any disclaimer, the term of this patent is extended or adjusted under 35 U.S.C. 154(b) by 234 days.

(21) Appl. No.: 16/914,714

(22) Filed: Jun. 29, 2020

(65) Prior Publication Data

US 2021/0409222 A1 Dec. 30, 2021

(51) Int. Cl.
*H04L 9/32* (2006.01)
(52) U.S. Cl.
CPC .......... *H04L 9/3234* (2013.01); *H04L 9/3236* (2013.01); *H04L 9/3247* (2013.01)
(58) Field of Classification Search
CPC ... H04L 9/3234; H04L 9/3236; H04L 9/3247; H04L 2209/127; H04L 63/0281; G06F 21/645
See application file for complete search history.

(56) References Cited

U.S. PATENT DOCUMENTS

| | | | |
|---|---|---|---|
| 10,346,614 | B1 | 7/2019 | Ko |
| 10,601,590 | B1 | 3/2020 | Chhabra |
| 11,122,346 | B1 * | 9/2021 | Kumar ................ H04L 63/0853 |
| 2010/0031047 | A1 | 2/2010 | Coker, II et al. |
| 2016/0366141 | A1 | 12/2016 | Smith |
| 2016/0380985 | A1 | 12/2016 | Chhabra |
| 2017/0251025 | A1 * | 8/2017 | Varley .................. H04L 9/3236 |

(Continued)

FOREIGN PATENT DOCUMENTS

| | | | |
|---|---|---|---|
| CN | 112134692 A | * 12/2020 | ............... H04L 9/08 |
| WO | 2019/013886 | 1/2019 | |

OTHER PUBLICATIONS

Machine translation of relevant section for CN 112134692 A, Pan et al, Dec. 25, 2020, 2 pages.*
Office Action dated Dec. 29, 2021 for U.S. Appl. No. 16/914,774, 20 pages.
Chen et al., "OPERA: Open Remote Attestation for Intel's Secure Enclaves", CCS '19, Nov. 11-15, 2019, pp. 2317-2331.
U.S. Appl. No. 16/914,774, filed Jun. 29, 2020, Moran.
U.S. Appl. No. 16/914,948, filed Jun. 29, 2020, Brossarp et al.

(Continued)

*Primary Examiner* — Christopher A Revak
(74) *Attorney, Agent, or Firm* — Nixon & Vanderhye P.C.

(57) ABSTRACT

Aspects of the present disclosure relate to an apparatus comprising first interface circuitry to communicate with relying party circuitry, the first interface circuitry being configured to receive, from the relying party circuitry, an attestation request in respect of a processing operation requested by attester circuitry to be performed by the relying party circuitry; second interface circuitry to communicate with the attester circuitry, the second interface circuitry being configured to: transmit the attestation request to the attester circuitry; and receive, from the attester circuitry, evidence data associated with the processing operation, and third interface circuitry to communicate with verifier circuitry, the third interface circuitry being configured to: transmit the evidence data to the verifier circuitry; and receive, from the verifier circuitry, attestation result data indicative of a verification of the evidence data, wherein the first interface circuitry is configured to transmit the attestation result data to the relying party circuitry.

20 Claims, 12 Drawing Sheets

(56) References Cited

U.S. PATENT DOCUMENTS

| | | |
|---|---|---|
| 2018/0212770 A1 | 7/2018 | Costa |
| 2018/0212966 A1 | 7/2018 | Costa |
| 2018/0285560 A1 | 10/2018 | Negi et al. |
| 2019/0020647 A1* | 1/2019 | Sinha .................. H04L 63/0442 |
| 2019/0036900 A1 | 1/2019 | Zhang et al. |
| 2019/0243950 A1 | 8/2019 | Soriente et al. |
| 2020/0021445 A1 | 1/2020 | Caceres et al. |
| 2020/0159966 A1 | 5/2020 | Sibert |
| 2020/0322380 A1* | 10/2020 | Sheth ...................... H04L 63/10 |
| 2020/0374132 A1* | 11/2020 | Lob .......................... G06F 16/27 |
| 2021/0143984 A1 | 5/2021 | Han |
| 2021/0200882 A1 | 7/2021 | Maor |
| 2022/0116387 A1* | 4/2022 | Pan ....................... H04L 63/205 |

OTHER PUBLICATIONS

International Search Report and Written Opinion of the International Searching Authority for PCT/US2021/070753 dated Sep. 24, 2021, 17 pages.

International Search Report and Written Opinion of the International Searching Authority for PCT/US2021/070754 dated Sep. 28, 2021, 15 pages.

International Search Report and Written Opinion of the International Searching Authority for PCT/US2021/070757 dated Oct. 8, 2021, 15 pages.

Final Office Action dated May 16, 2022 for U.S. Appl. No. 16/914,774, 21 pages.

\* cited by examiner

METHODS AND APPARATUS FOR PERFORMING ATTESTATION

BACKGROUND

The present technique relates to the field of verification of actions that are to be performed in a processing system. For example, one device may interact with another device, and it may be desirable for the second device to prove to the first device that is configured in the manner expected by the first device. One way of performing such verification is attestation, wherein an attestation process is performed to securely verify, to the first device, that the second device will function as expected. Assurance is thus provided to the first device that it can trust the second device.

It would be desirable to provide a system in which an attestation process with improved security and resource consumption can be performed.

SUMMARY

At least some examples provide an apparatus comprising:
first interface circuitry to communicate with relying party circuitry, the first interface circuitry being configured to receive, from the relying party circuitry, an attestation request in respect of a processing operation to be performed by the relying party circuitry;
second interface circuitry to communicate with attester circuitry, the second interface circuitry being configured to:
 transmit the attestation request to the attester circuitry; and
 receive, from the attester circuitry, evidence data associated with the processing operation, and
third interface circuitry to communicate with verifier circuitry, the third interface circuitry being configured to:
 transmit the evidence data to the verifier circuitry; and
 receive, from the verifier circuitry, attestation result data indicative of a verification of the evidence data,
wherein the first interface circuitry is configured to transmit the attestation result data to the relying party circuitry.

Further examples provide a method comprising:
transmitting, from relying party circuitry, via relay circuitry, to attester circuitry, an attestation request in respect of a processing operation to be performed by the relying party circuitry;
transmitting, from attester circuitry, via the relay circuitry, to verifier circuitry, evidence data associated with the processing operation; and
transmitting, from the verifier circuitry, via the relay circuitry, to the relying party circuitry, attestation result data indicative of a verification of the evidence data.

Further examples provide an apparatus comprising:
first interface circuitry to communicate with relying party circuitry, the first interface circuitry being configured to receive, from the relying party circuitry, an attestation request in respect of a processing operation to be performed by the relying party circuitry;
evidence determination circuitry to:
receive the attestation request from the first interface circuitry; and
determine, in response to the attestation request, evidence data associated with the processing operation, and
second interface circuitry to communicate with verifier circuitry, the second interface circuitry being configured to:
 transmit the evidence data to the verifier circuitry; and
 receive, from the verifier circuitry, attestation result data indicative of a verification of the evidence data,
wherein the first interface circuitry is configured to transmit the attestation result data to the relying party circuitry.

Further aspects, features and advantages of the present technique will be apparent from the following description of examples, which is to be read in conjunction with the accompanying drawings.

DESCRIPTION OF EXAMPLES

Figure 1:
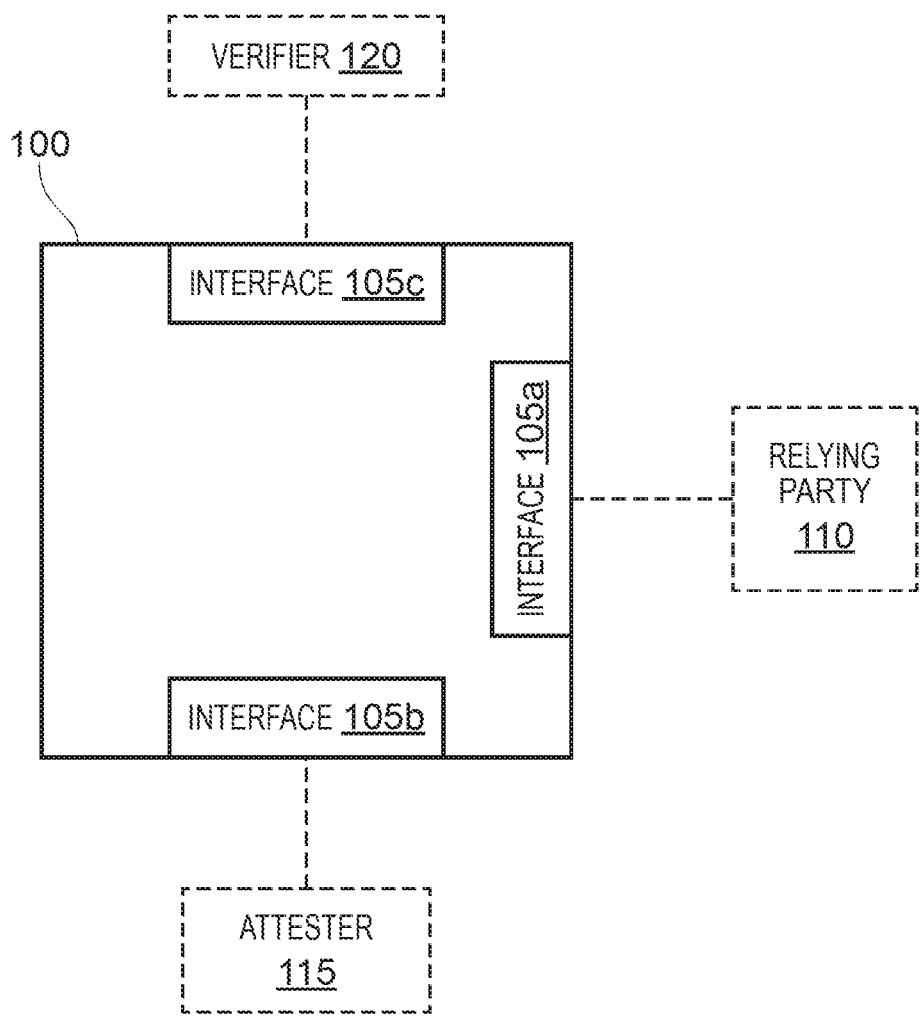
FIG. 1 schematically depicts an apparatus according to an example of the present disclosure.

As indicated above, in one example there is provided an apparatus in communication with relying party circuitry, attester circuitry and verifier circuitry. The apparatus comprises first interface circuitry to communicate with the relying party circuitry, second interface circuitry to communicate with the attester circuitry, and third interface circuitry to communicate with the verifier circuitry. The apparatus can thus act as a relay between the relying party circuitry, attester circuitry and verifier circuitry. The apparatus and the aforementioned circuitry elements may be implemented within separate devices, for example connected via buses or a network. Alternatively, some of the circuitry elements and/or apparatus may be implemented within the same device.

A processing operation is to be performed by the relying party circuitry. For example, the attester circuitry may request, to the relying party circuitry, to perform the processing operation. Alternatively, the relying party circuitry may initiate the processing operation. The processing operation may for example be an operation to establish a secure communication session. From the perspective of the relying party circuitry, it is desirable to confirm that the attester circuitry is configured as expected. For example, it may be desirable to confirm that the attester circuitry and/or software executed by the attester circuitry is permitted to request performance of the processing operation, before the relying party circuitry performs said operation. The relying party circuitry can thus be said to "rely" on the attestation. To that end, the relying party circuitry issues an attestation request in respect of the processing operation. The request may contain a nonce, to prevent replays.

The first interface circuitry of the apparatus is configured to receive the attestation request. The attestation request is then transmitted, via the second interface circuitry, to the attester circuitry. In response to this, the attester circuitry issues evidence data associated with the processing operation.

In an example, the evidence data evidences an authenticity of the processing operation. The evidence data can thus be used to verify the authenticity of the processing operation. For example, the evidence data may comprise data indicative of said processing operation, such as a cryptographic hash of at least a subset of computer program instructions corresponding to said operation, and/or a cryptographic hash of computer program instructions executed by the attester circuitry. Such evidence data can be compared to corresponding reference evidence data (e.g. a hash) associated with a valid processing operation, to confirm that the requested processing operation is valid. Alternatively or additionally, the evidence data may comprise a cryptographic signature associated with the attester circuitry, to confirm that the evidence data did indeed originate from the attester circuitry. The evidence data may include the aforementioned nonce.

The second interface circuitry is configured to receive, from the attester circuitry, the evidence data associated with the processing operation.

The third interface circuitry is configured to transmit the evidence data to the verifier circuitry. The verifier circuitry verifies the evidence data, for example by comparing the evidence data with reference evidence data that is known to be associated with a valid processing operation. The verifier circuitry then issues attestation result data indicative of the verification of the evidence data. The attestation result data may include the aforementioned nonce.

The third interface circuitry is configured to receive the attestation result data from the verifier circuitry. The attestation result data is transmitted, via the first interface circuitry, to the relying party circuitry. The relying party circuitry can thus be assured that the attestation operation has been successful and that the processing operation is valid.

The above-described apparatus can thus provide for attestation to be securely performed without requiring the party that depends on the attestation (i.e. the relying party circuitry) to be directly connected to the verifier circuitry, whilst also not requiring the apparatus to be trusted by the other circuitry elements. Versatility is thus greatly improved compared to comparative systems in which a party that depends on attestation must perform that attestation by way of a direct link to an attestation verifier. For example, the present apparatus allows the relying party circuitry to have no other outgoing connections other than via the apparatus, thereby allowing the relying party circuitry to be implemented as a plug-in device (for example via Universal Serial Bus (USB) or other connection). As an example, the relying party circuitry may be a plug-in hardware security module (HSM) device.

Furthermore, this reduces the processing overhead associated with the relying party circuitry, and in particular allows attestation without requiring the relying party circuitry to maintain detailed knowledge regarding expected software to be executed by the attester circuitry.

As indicated above, in some examples the attester circuitry is implemented within the same physical device as the apparatus. For example, the attester circuitry may implement a trusted execution environment (TEE). In this example, the attestation process serves to authenticate the contents of the trusted execution environment to external parties (i.e. to the relying party circuitry), without requiring such external parties to trust the apparatus itself.

In an example, the apparatus comprises fourth interface circuitry to communicate with software authority circuitry. The software authority maintains a security policy. The fourth interface circuitry is configured to transmit at least one of the evidence data and the attestation result data to the software authority circuitry. Based on this, the software authority can confirm that said at least one of the evidence data and attestation result data satisfy the security policy, and issue security policy result data indicative of this. The fourth interface circuitry is accordingly configured to receive the security policy result data from the software authority circuitry. The first interface circuitry is configured to perform said transmitting of the attestation result data to the relying party circuitry responsive to said receiving of the security policy result data. It can thus be assured that the attestation process will not be deemed a success unless the security policy has been satisfied. For example, the security policy may be set such that only a current version of the processing operation is permitted. Outdated software can thus be disallowed, without requiring parties other than the software authority circuitry to maintain an up-to-date record of what is permitted. Data traffic overhead is thus reduced.

In one such example, the attestation request includes software policy data for evaluation by the software authority circuitry. This software policy data indicates a software identifier and may indicate, for example, a hardware version, a software version, and/or an instance identity. In examples in which the attester circuitry is associated with the relay apparatus, for example a TEE thereof, the apparatus may use the software identifier to initialise the attester circuitry. The relying party circuitry may use a policy identifier instead of a full policy.

In an alternative example, the second interface circuitry is configured to receive, from the attester circuitry, software authorisation data associated with said processing operation. The software authorisation data comprises a cryptographic signature associated with a software authority. Whereas the previous example provided online verification that a security policy is satisfied, the present example can be considered to provide offline verification of the same, for example by previously provisioning the attester circuitry with data indicative of the security policy. The cryptographic signature provides assurance that the security policy was correctly applied. The present example reduces data traffic relative to the previous example, although this is traded off against the security being dependent on the attester circuitry being kept up-to-date. The signature may have an associated delegation chain such as that of Public Key Infrastructure (PKI). This enables the authorised software of the attester circuitry to be changed without direct contact with the relying party circuitry, thereby allowing more efficient scaling to systems with large numbers of relying parties.

In one such example, the cryptographic signature includes a replay counter, and the relying party circuitry is configured to reject the software authorisation data if it has ever seen a higher value of replay counter than the one presented.

In one aspect of the present disclosure a method is provided, which may be implemented within a system comprising the above-described apparatus. The method comprises:

transmitting, from relying party circuitry, via relay circuitry, to attester circuitry, an attestation request in respect of a processing operation requested by attester circuitry to be performed by the relying party circuitry;

transmitting, from the attester circuitry, via the relay circuitry, to verifier circuitry, evidence data associated with the processing operation; and transmitting, from the verifier circuitry, via the relay circuitry, to the relying party circuitry, attestation result data indicative of a verification of the evidence data.

The method may comprise determining, by the attester circuitry, the evidence data. The method may further comprise cryptographically signing, by the attester circuitry, the evidence data. This allows assurance for the verifier circuitry that the evidence data is authentic.

The method may comprise, by the verifier circuitry, verifying the evidence data and, responsive to said verifying, determining the attestation result data. The verifier circuitry can thereby perform the above-described verification of the evidence data and communicate this by way of the attestation result data. Verifying the evidence data may comprise confirming, based on the evidence data, that the processing operation satisfies a security policy, for example as described above.

Alternatively or additionally, determining the attestation result data may comprise cryptographically signing the attestation result data. The origin of the attestation result data can thus be authenticated.

In an example the method comprises, by the relying party circuitry, confirming the attestation result data and, responsive to said confirming, performing the processing operation. The performance of the operation can thus be reliant on a successful outcome of the attestation process, thereby providing assurance that processing operation will be as expected and permitted. Confirming the attestation result data may comprise confirming that the attestation result data matches expected attestation result data. Such expected attestation result data may for example be received from software authority circuitry.

In a further aspect of the present disclosure, there is provided an apparatus in communication with relying party circuitry and verifier circuitry. The apparatus comprises a first interface circuitry to communicate with the relying party circuitry, the first interface circuitry being configured to receive, from the relying party circuitry, an attestation request in respect of a processing operation requested by the apparatus to be performed by the relying party circuitry.

The apparatus further comprises evidence determination circuitry to receive the attestation request from the first interface circuitry and to determine, in response to the attestation request, evidence data associated with the processing operation. The evidence determination circuitry thus performs a role analogous to that of the attester circuitry in the previous example.

The apparatus further comprises second interface circuitry to communicate with the verifier circuitry. The second interface circuitry is configured to transmit the evidence data to the verifier circuitry, and to receive, from the verifier circuitry, attestation result data indicative of a verification of the evidence data. The first interface circuitry is configured to transmit the attestation result data to the relying party circuitry.

The present apparatus thus functions as an attester device, thereby allowing the relay and attester functionality to be performed by the same device. A system is thus provided without requiring a separate relay device.

In an example, the apparatus comprises third interface circuitry to communicate with software authority circuitry. As for the example above, the software authority circuitry maintains a security policy.

The third interface circuitry is configured to transmit at least one of the evidence data and the attestation result data to the software authority circuitry, and to receive, from the software authority circuitry, security policy result data indicative of a confirmation that said at least one of the evidence data and the attestation result data satisfies a security policy. The first interface circuitry is configured to perform said transmitting of the attestation result data to the relying party circuitry responsive to said receiving of the security policy result data. The above-described software authority functionality can thus be implemented in the present example apparatus.

In this example, the evidence determination circuitry may be configured to receive, from software authority circuitry, authorisation data associated with a trusted application to be executed by the evidence determination circuitry, and to use the trusted application to perform said determining of the evidence data. The first interface circuitry can accordingly be configured to transmit said authorisation data, with the attestation result data, to the relying party circuitry. This provides a mechanism for offline authorisation of the attestation process, within the present example apparatus which performs both attestation and relay functionality.

Examples of the present disclosure will now be described with reference to the drawings.

FIG. 1 schematically shows a relay apparatus 100 according to an example of the present disclosure.

The apparatus 100 comprises interfaces 105a, 105b, 105c for communication with a relying party 110, an attester 115, and a verifier 120, respectively. It is desired for the relying party 110 to perform a processing operation requested by the attester 115.

Figure 2:
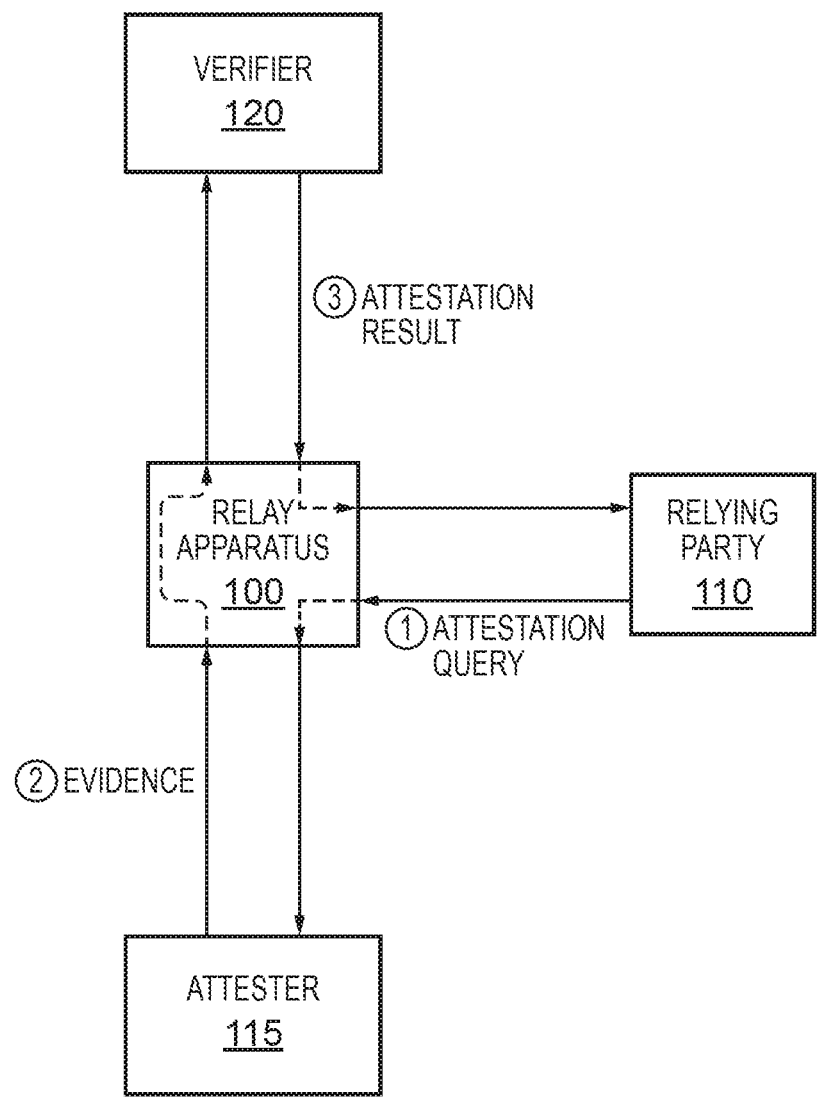
FIG. 2 depicts a flow of operations according to an example of the present disclosure.

FIG. 2 schematically illustrates a flow of operations by which the relying party 110 can be assured of the authenticity of the processing operation which it has been requested to perform by the attester 115. The relying party 110 can thus be said to "rely" on the attestation of the attester. For ease of representation, the interfaces 105a, 105b, 105c are not shown.

The flow begins with the relying party 110 issuing an attestation request in respect of the processing operation. This is forwarded, via the relay apparatus 100, to the attester 115.

In response to receiving the attestation request, the attester 115 issues evidence data in respect of the processing operation. This may for example include a hash of processing instructions associated with the operation. The evidence may be signed, to prove that it originated at the attester 115. The evidence data is forwarded, via the relay apparatus 100, to the verifier 120.

The verifier 120 verifies the data. The verifier 120 may for example be an authoritative service which is trusted by the relying party. In examples, the verifier 120 may be a service provided by a manufacturer of the relying party 110, or a service provided by a manufacturer of the attester 115. This serves to confirm that the processing operation is authentic and permitted. For example, the verifier may check the identity of the attester 115 against a list of attesters which are known to have been compromised. The verifier issues an attestation result indicative of this verification, which is forwarded via the relay apparatus 100 to the relying party 110.

The relying party 110 is thus assured that the processing operation is authentic and permitted, and can proceed to perform the operation.

Figure 3:
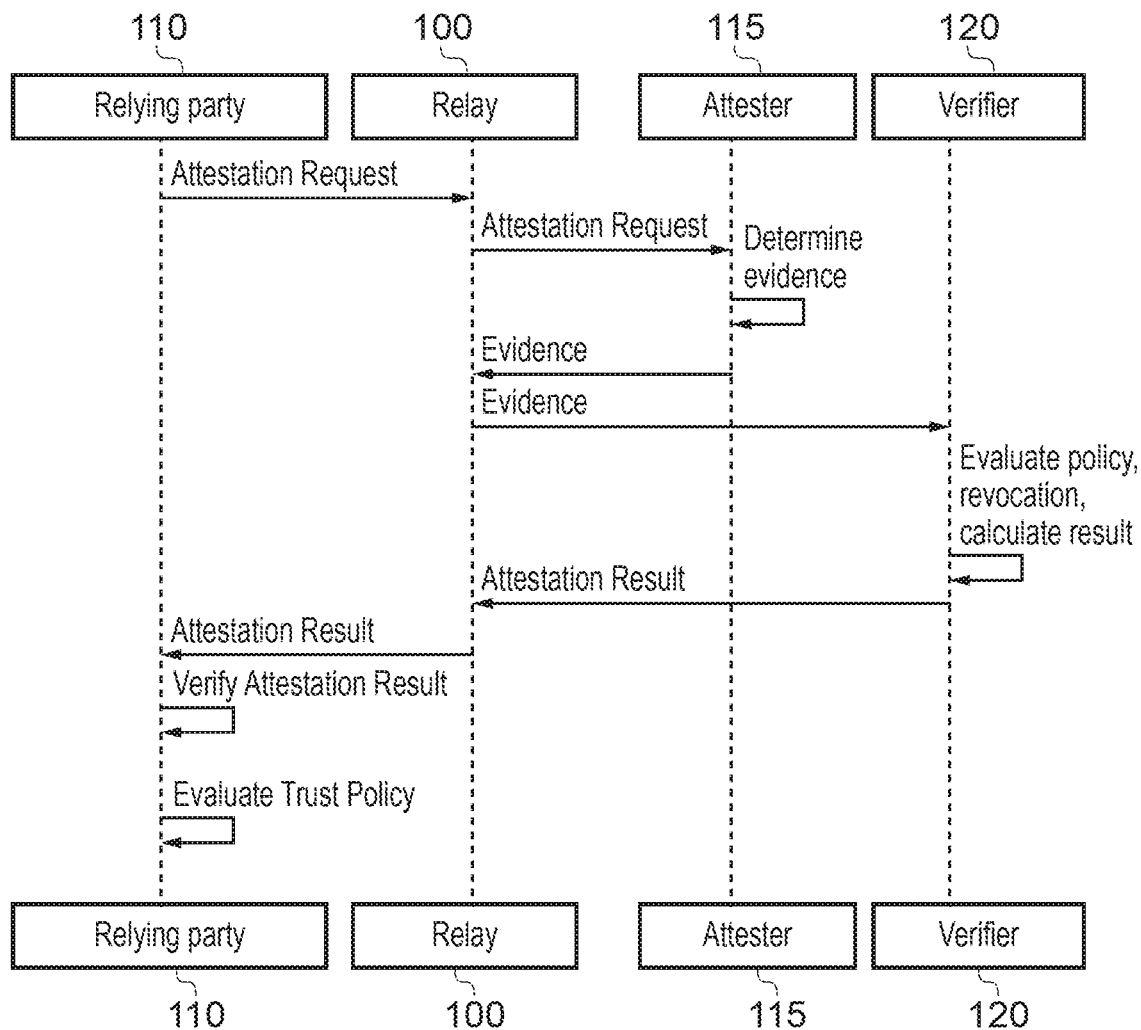
FIG. 3 depicts an attestation operation which can be performed within the apparatus of FIG. 2.

FIG. 3 illustrates, in more detail, an attestation operation which can be performed within the system of FIG. 2.

The relying party 110 issues an attestation request to the relay 100. The relay forwards this to the attester 115.

The attester 115 determines appropriate evidence for the attestation, and transmits this to the relay 100. The relay 100 forwards this to the verifier 120.

The verifier 120 evaluates the evidence against one or more policies, such as security policies, and determines an attestation result indicative of whether the evidence satisfies the policies. The verifier transmits this attestation result to the relay 100, which forwards it to the relying party 110.

The relying party 110 then verifies the attestation result, giving confidence that the processing operation is indeed what was represented by the contents of the attestation result. Finally, the relying party 110 evaluates a trust policy, for example to verify the attestation result against an expected operation, to confirm that the requested processing operation matches what the relying party 110 expects to perform.

Figure 4:
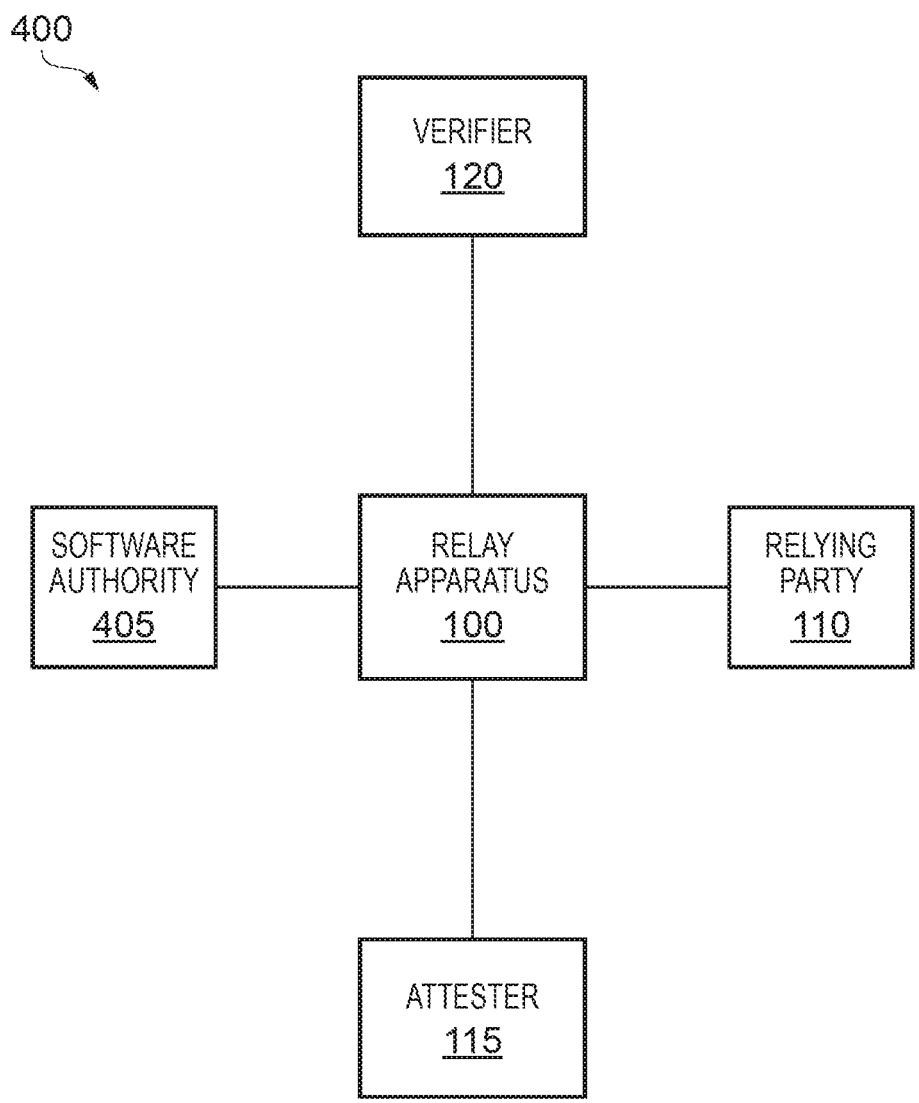
FIG. 4 schematically illustrates a system according to an example of the present disclosure.

FIG. 4 schematically illustrates a system 400 according to an example of the present disclosure. The system 400 comprises a relying party 110, attester 115, and verifier 120, similar to those described above in relation to other examples. The system 400 further comprises a software authority 405, communicatively coupled to the relay apparatus 100. The software 405 maintains security policies, for example defining acceptable software versions to be executed by the attester 115.

Figure 5A:
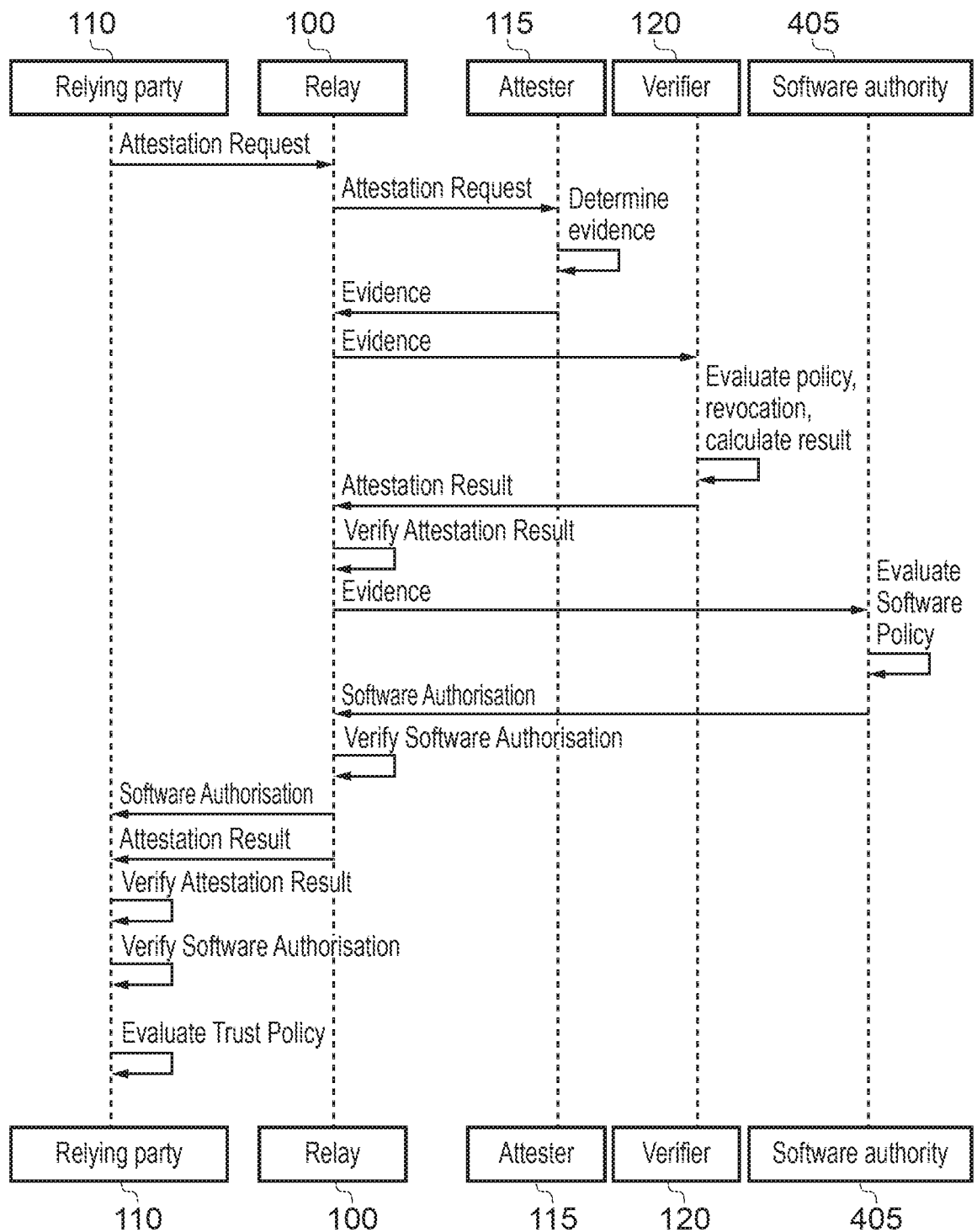
FIGS. 5A, 5B, and 6 illustrate example communication flows in the system of FIG. 4.

FIG. 5A illustrates an example communication flow in the system 400.

The flow begins in a similar manner to that of FIG. 3, with the relying party 110 issuing an attestation request which is transmitted, via the relay 100, to the attester 115. The attester 115 determines corresponding evidence and transmits this to the verifier 120, which determines an attestation result and transmits this to the relay 100.

The flow then diverges from that of FIG. 3. The relay 100 verifies the attestation result and, responsive to a positive verification, transmits the evidence to the software authority 405. The software authority 405 evaluates the evidence against one or more software policies. For example, the software authority 405 may confirm that the evidence indicates that the attester is running a current and valid version of the software and not an outdated or compromised version. If this evaluation is positive, the software authority 405 transmits a software authorisation to the relay 100.

The relay 100 verifies the software authorisation. If the authorisation is positive, the relay 100 transmits the software authorisation and the attestation result to the relying party 110. The relying party 110 then verifies the attestation result and evaluates the trust policy, as set out above in relation to FIG. 3. Furthermore, the relying party 110 verifies the software authorisation. If these verifications are positive, the relying party 110 is assured that the processing operation it has been requested to perform is authentic and valid, and arose from a permitted software version. This is achieved without any party other than the software authority 405 having to keep track of dynamic policies such as, for example, which software version are permitted.

Figure 5B:
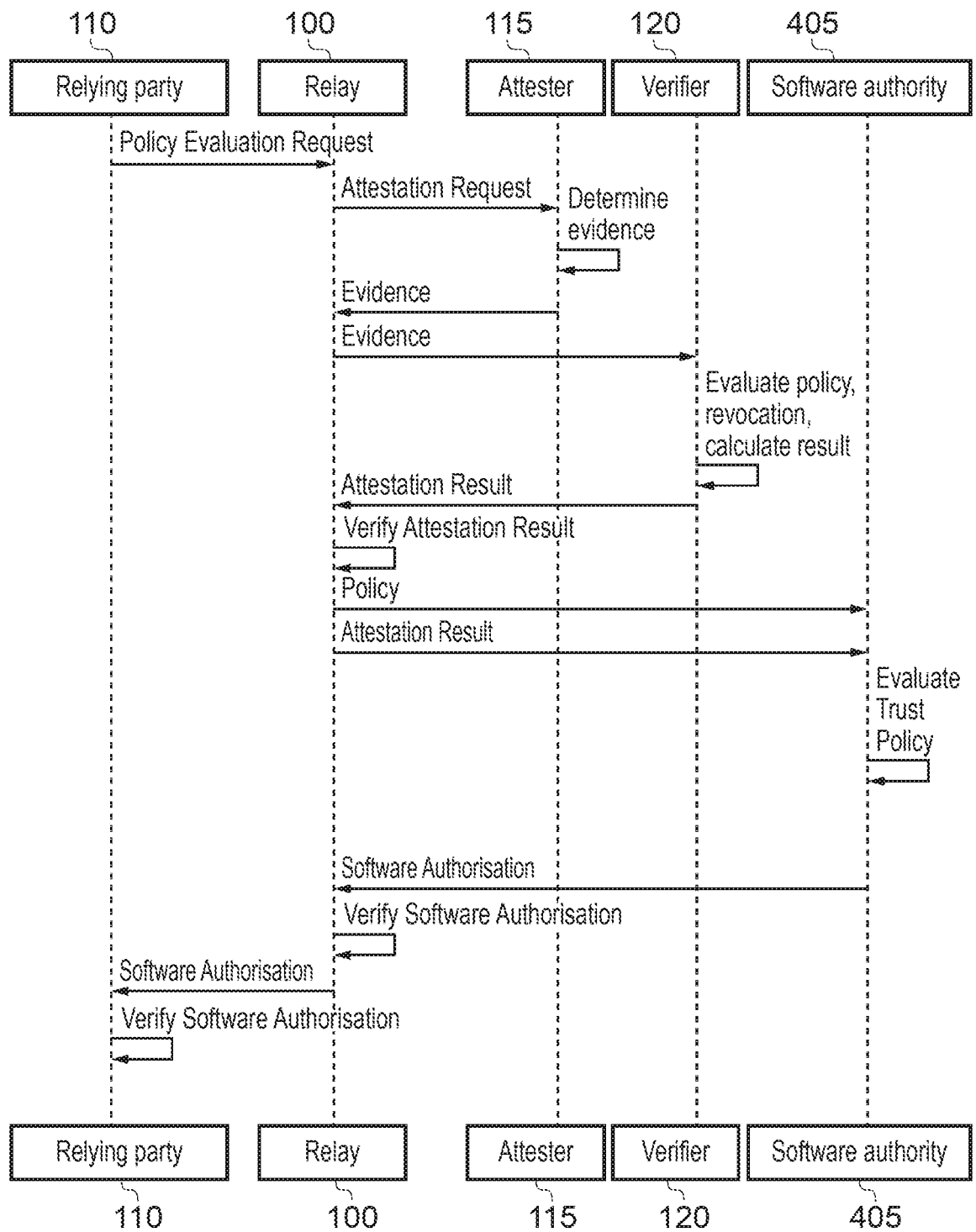

FIG. 5B illustrates an alternative example communication flow in the system 400. The relying party 110 transmits a policy evaluation request to the relay 100. This serves as an attestation request, whilst also containing data indicative of the trust policy which, in the flow of FIG. 5A, was evaluated by the relying party 110.

The relay 100 transmits a corresponding attestation request to the attester 115 which, as in FIG. 5A, determines associated evidence. The evidence is transmitted, via the relay 100, to the verifier 120. The verifier 120 determines an attestation result as transmits this to the relay 110, which verifies the attestation result.

Responsive to a positive attestation result, the relay 100 transmits the attestation result, along with data indicative of the trust policy, to the software authority 405. The software authority evaluates the trust policy and transmits an associated software authorisation to the relay 100. The relay 100 verifies the software authorisation and, responsive to a positive verification, transmits the software authorisation to the relying party 110.

The relying party then verifies the software authorisation. Provided that the relying party 110 trusts the software authority 405, it does not need to separately evaluate the attestation result and the trust policy: this functionality has been offloaded to the relay 100 and software authority 405.

Figure 6:
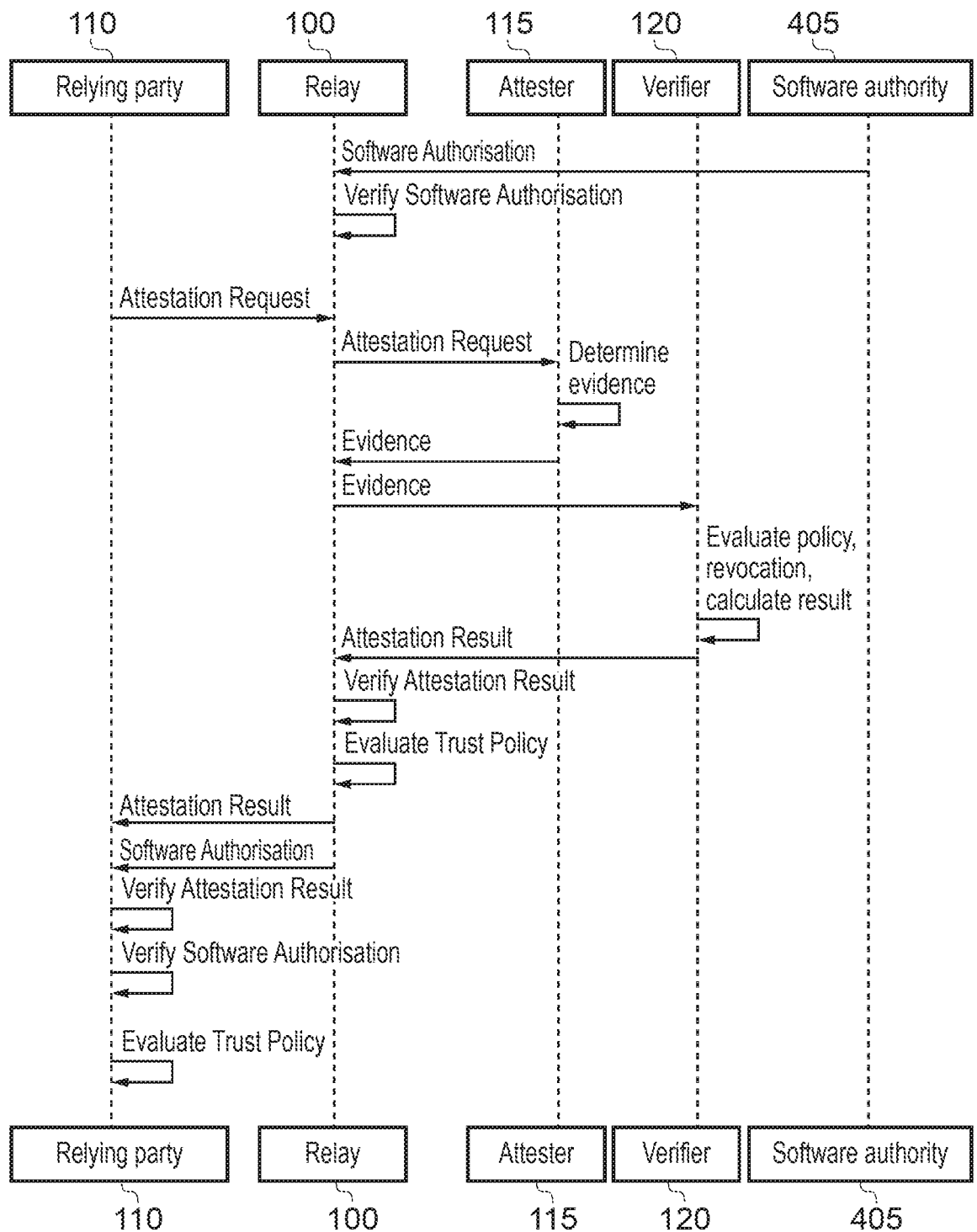

FIG. 6 illustrates a further example communication flow in the system 400. Whereas FIGS. 5A and 5B depicted online verification of the software authority policy, wherein the communication with the software authority 405 occurs during the attestation process, FIG. 6 depicts offline verification which does not require such communication during the attestation process. This method can thus be used in systems in which a large number of attestation operations are to be performed, which would otherwise necessitate a large number of communications to and from the software authority 405. This method can also be used in systems in which constant access to the software authority 405 is not available.

The flow begins, prior to the initiation of the attestation process, with the software authority 405 providing software authorisation data to the relay 100 and the relay 100 verifying this data. The software authority 405 takes no further part in the process, except potentially to later update the software authorisation data (not shown in FIG. 6).

The attestation process then begins, as for FIG. 5A, with the relying party 110 transmitting an attestation request to the relay 100. The relay 100 forwards the attestation request to the attester 115, which determines associated evidence and transmits this evidence to the relay 100.

The relay 100 forwards the evidence to the verifier 120, which verifies the evidence against a security policy, determines an attestation result, and transmits the attestation result to the relay 100. The relay verifies the attestation result and uses the previously-received software authorisation data to evaluate the trust policy. The attestation result and software authorisation confirmation are then transmitted to the relying party 110, which verifies these and evaluates the trust policy. Subject to a successful outcome, the relying party can proceed with performing the requested operation.

Figure 7:
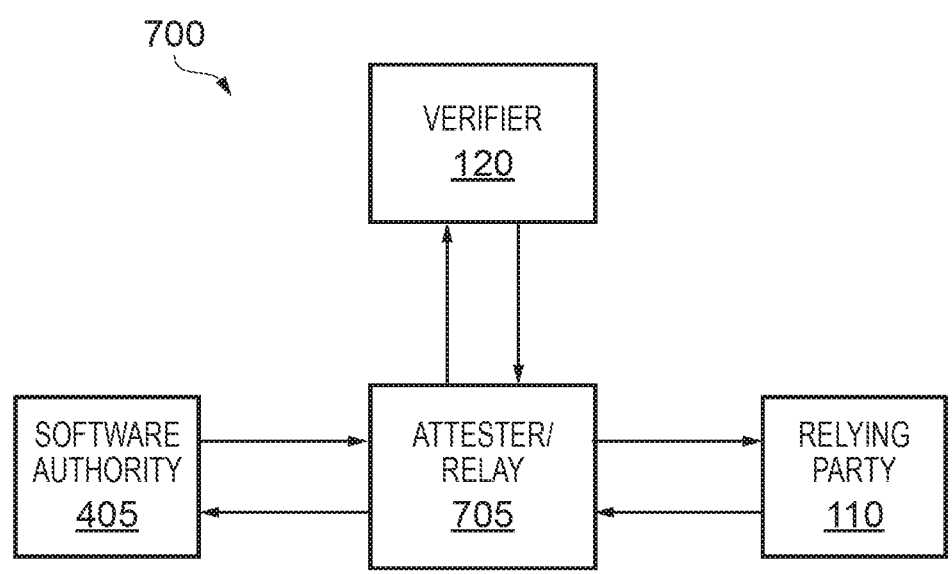
FIG. 7 schematically illustrates a system according to an example of the present disclosure.

FIG. 7 schematically shows a system 700 according to a further example of the present disclosure. The system 700 comprises an attester/relay 705, which performs the functions of the previously-described relay 100 and attester 115. In other words, the attester also functions as a relay.

The system 700 further comprises a relying party 110, which is to perform a processing operation requested by the attester/relay 705, a verifier 120, and a software authority 405. The verifier 120 and software authority 705 are analogous those described above.

Figure 8A:
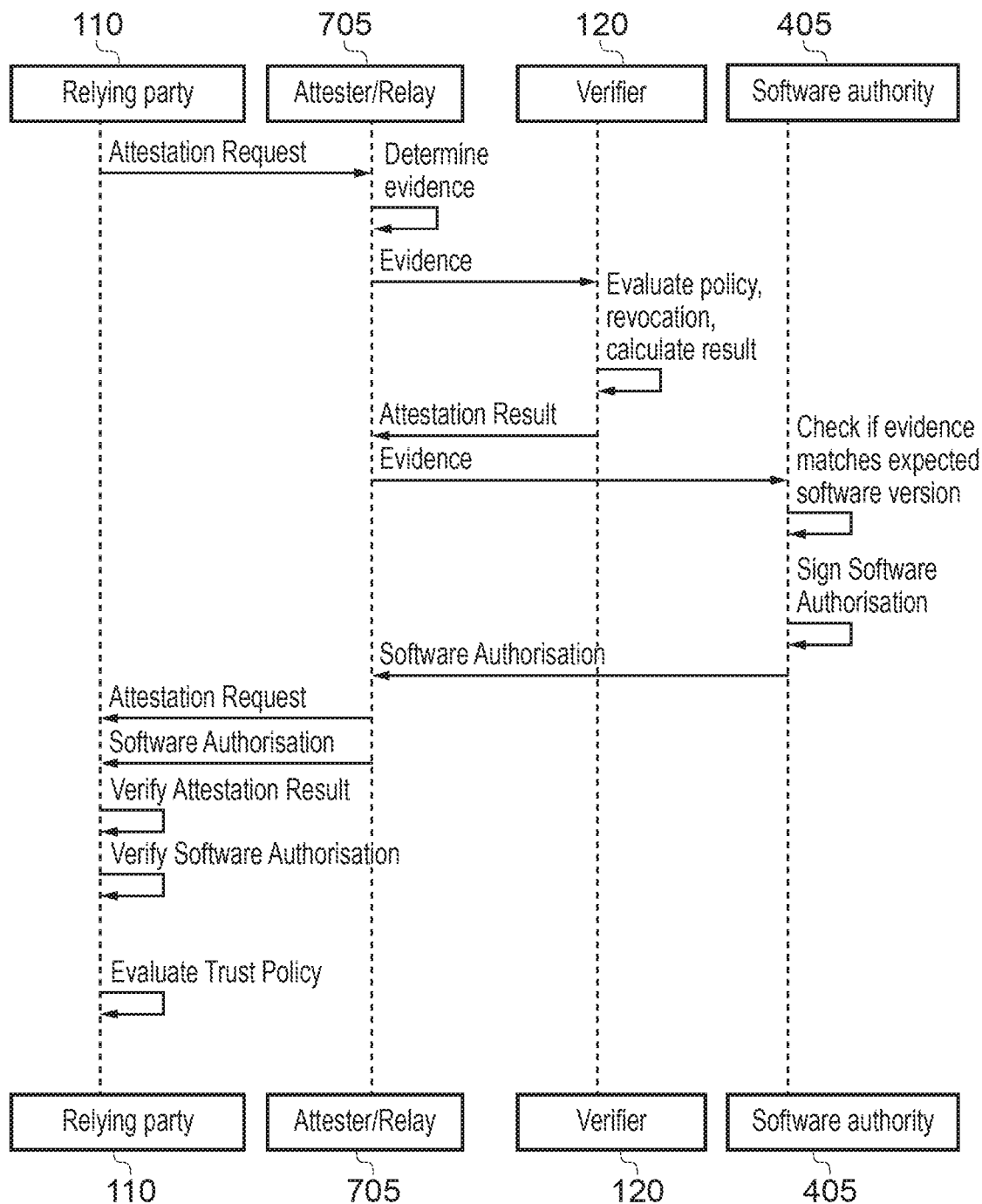
FIGS. 8A, 8B and 9 illustrate example communication flows in the system of FIG. 7.

FIG. 8A depicts a communication flow corresponding to an attestation process in the system 700, in respect of the processing operation which the attester/relay 705 requests for the relying party 110 to perform.

The relying party 110 transmits an attestation request to the attester/relay 705. The attester/relay 705 determines associated evidence, and transmits this evidence to the verifier 120.

The verifier 120 verifies the evidence based on a security policy, determines a corresponding attestation result and transmits this to the attester/relay 705.

The attester/relay 705 transmits the evidence to the software authority 405. The software authority 405 checks if the evidence matches an expected (or approved) software version and, if so, signs a software authorisation. The software authority 405 then transmits the software authorisation to the attester/relay 705.

The attester/relay 705 transmits the attestation result and software authorisation to the relying party 110. The relying party 110 verifies these and evaluates a trust policy. If these are satisfied, the relying party can have confidence in the authenticity of the software being run by the attester/relay 705, and can proceed to perform the requested operation.

Figure 8B:
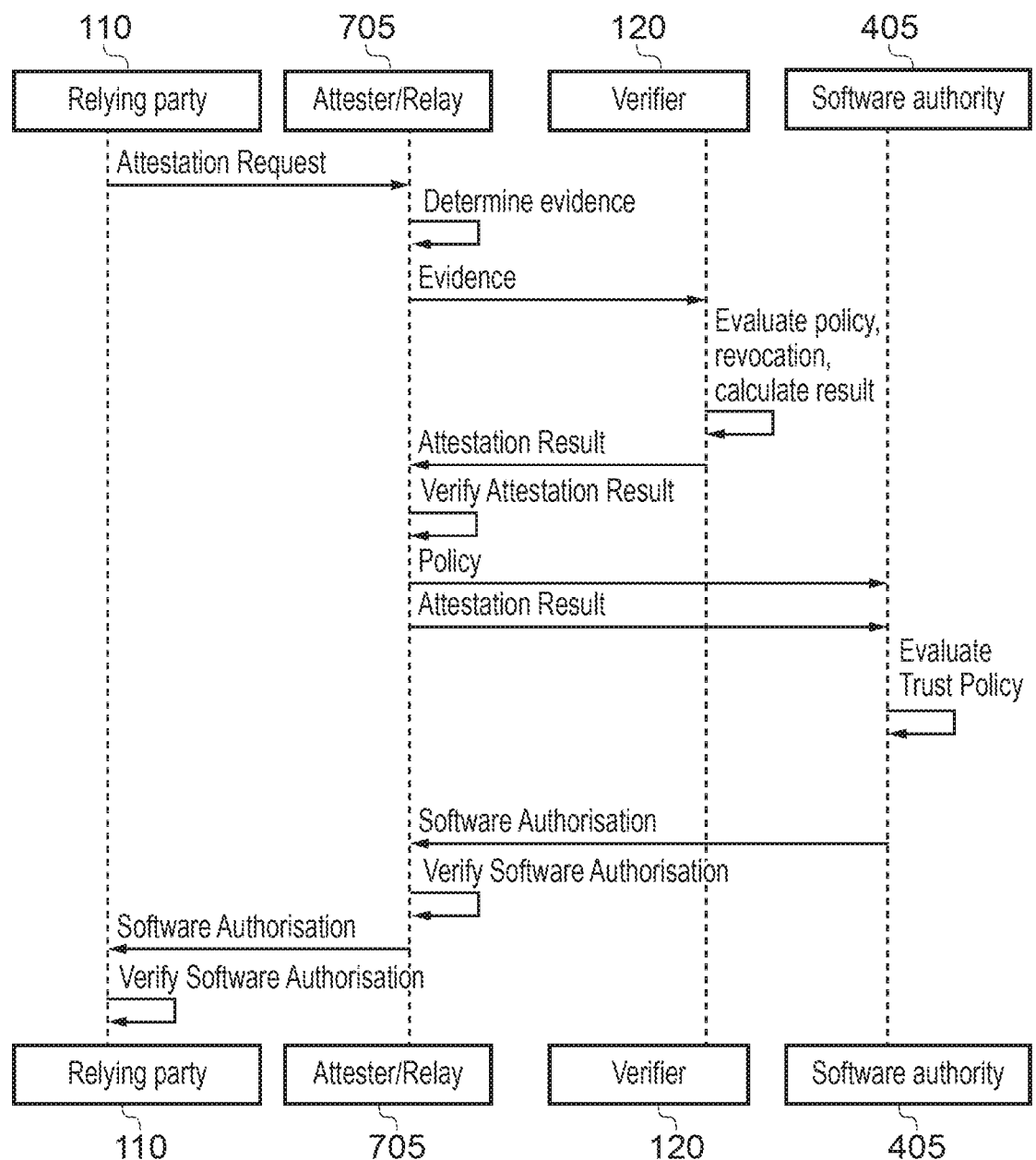

FIG. 8B depicts an alternative communication flow within the system 700. Whereas the flow of FIG. 8A is in some ways analogous to that of FIG. 5A, the flow of FIG. 8B is analogous to that of FIG. 5B in that some functionality is offloaded from the relying party 110, thereby reducing the processing resource requirements of the relying party 110.

The relying party 110 transmits an attestation request to the attester/relay 705. The attester/relay 705 determines the associated evidence and transmits this to the verifier 120, which verifies the evidence and transmits an attestation result to the attester/relay 705 in the same manner as described above in relation to FIG. 8A.

The attester/relay 705 verifies the attestation result and, responsive to a positive verification, transmits trust policy data and the attestation result to the software authority 405. The software authority 405 evaluates the trust policy and, responsive to a positive evaluation, transmits a software authorisation to the attester/relay 705.

The attester/relay 705 verifies the software authorisation. If the verification is positive, the attester/relay transmits the software authorisation to the relying party 110, which verifies the software authorisation. The evaluation of the trust policy and verification of the attestation result are thus offloaded to the software authority 405 and attester/relay 705. Processing overhead for the relying party 110 can thereby be reduced, if the relying party 110 trusts the attester/relay 705.

Figure 9:
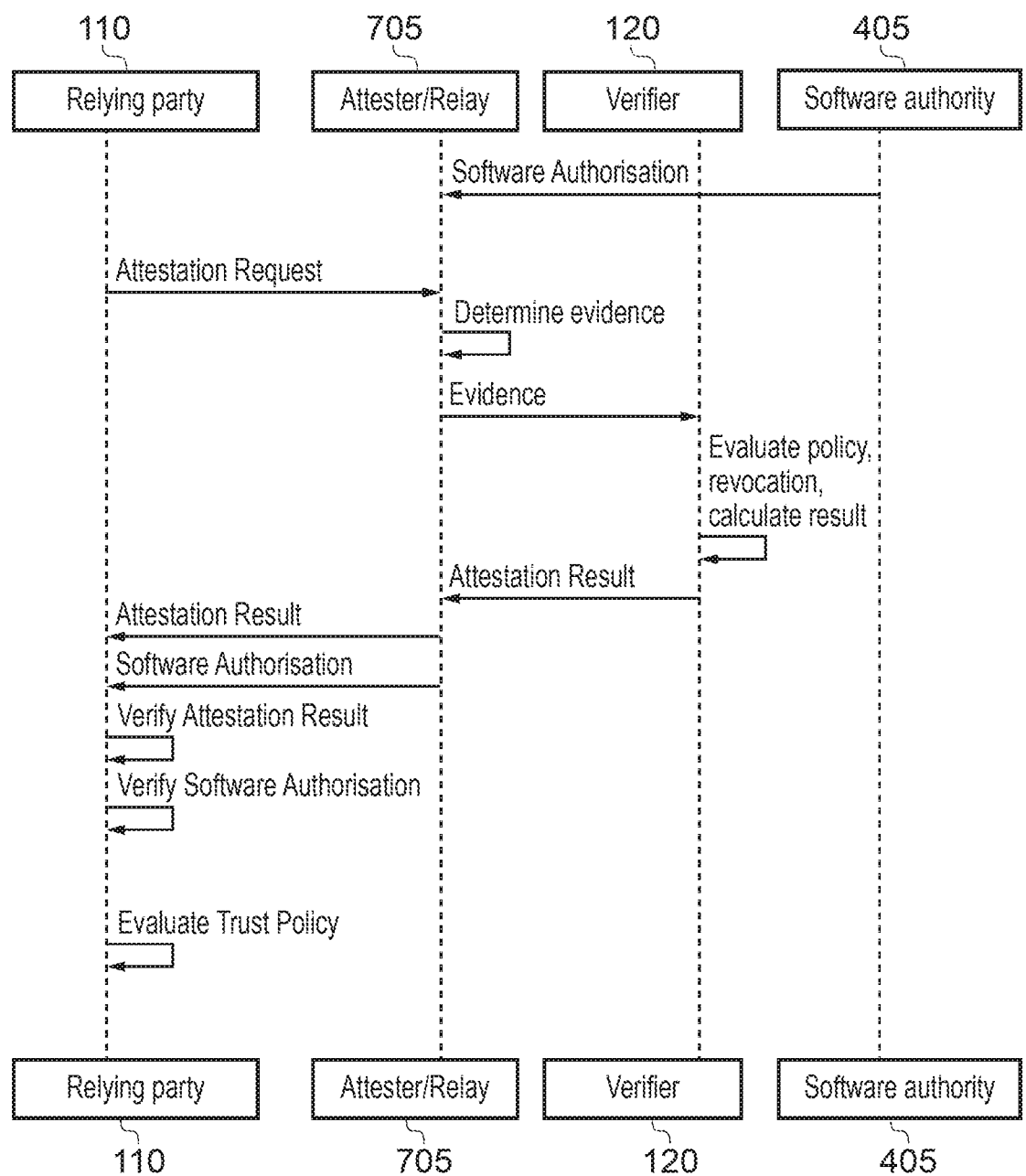

FIG. 9 depicts a communication flow by which offline software authorisation can be provided within the system 700.

Prior to beginning the attestation process, the software authority provides the attester/relay 705 with software authorisation data.

At a later time, the attestation process then begins with the relying party 110 transmitting an attestation request to the attester/relay 705. The attester/relay 705 determines associated evidence, and transmits this evidence to the verifier 120. The verifier 120 verifies that the evidence satisfies a security policy, determines an attestation result, and transmits the attestation result to the attester/relay 705.

The attester/relay 705 transmits the attestation result and a software authorisation to the relying party 110. The relying party 110 verifies these and evaluates a trust policy. Responsive to a successful outcome, the relying party is assured of the authenticity of the processing operation which it has been requested to perform, and can safely perform the operation.

Figure 10:
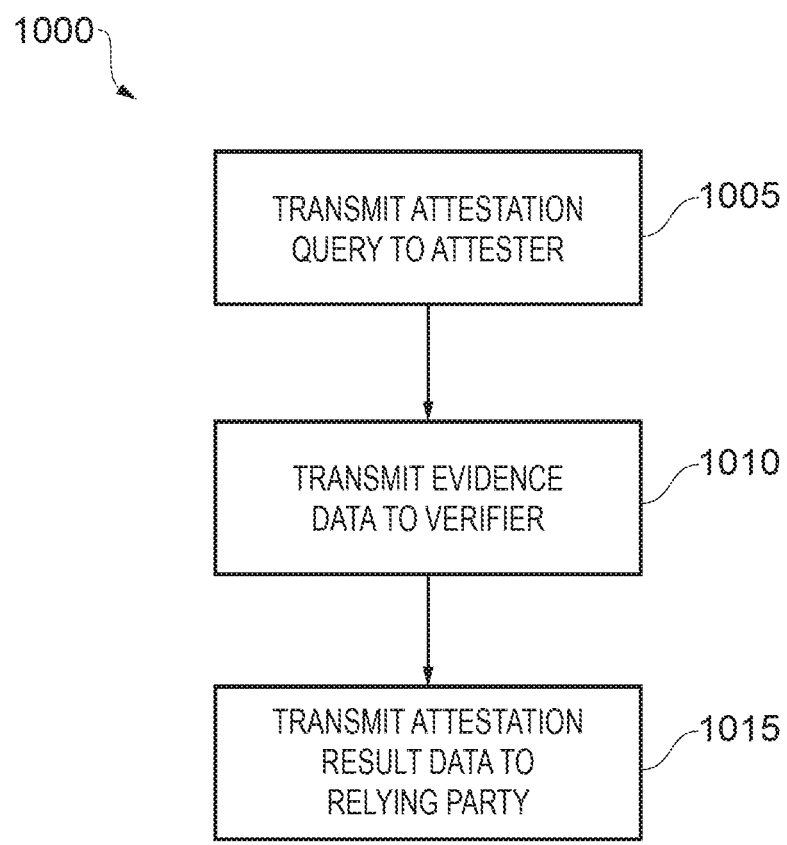
FIG. 10 depicts a method according to an example of the present disclosure.

FIG. 10 schematically illustrates a method 1000 according to an example of the present disclosure. The method may be performed within one of the systems described above.

At block 1005, the method comprises transmitting, from relying party circuitry, via relay circuitry, to attester circuitry, an attestation request in respect of a processing operation requested by attester circuitry to be performed by the relying party circuitry.

At block 1010, the method comprises transmitting, from the attester circuitry, via the relay circuitry, to verifier circuitry, evidence data associated with the processing operation/

At block 1015, the method comprises transmitting, from the verifier circuitry, via the relay circuitry, to the relying party circuitry, attestation result data indicative of a verification of the evidence data.

Apparatuses and methods are thus provided for providing improved attestation. From the above description it will be seen that the techniques described herein provides a number of significant benefits. In particular, the security of the attestation process is improved, and the network and processing resource usage of the attestation process is reduced.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
first interface circuitry to communicate with relying party circuitry, the first interface circuitry being configured to receive, from the relying party circuitry, an attestation request in respect of a processing operation to be performed by the relying party circuitry;
second interface circuitry to communicate with attester circuitry, the second interface circuitry being configured to:
transmit the attestation request to the attester circuitry; and
receive, from the attester circuitry, evidence data associated with the processing operation, and
third interface circuitry to communicate with verifier circuitry, the third interface circuitry being configured to:
transmit the evidence data to the verifier circuitry; and
receive, from the verifier circuitry, attestation result data indicative of a verification of the evidence data,
wherein the first interface circuitry is configured to transmit the attestation result data to the relying party circuitry.

2. An apparatus according to claim 1, wherein the evidence data evidences an authenticity of said processing operation.

3. An apparatus according to claim 2, wherein the evidence data comprises data indicative of said processing operation.

4. An apparatus according to claim 3, wherein the data indicative of said processing operation comprises a cryptographic hash of at least a subset of computer program instructions corresponding to said operation.

5. An apparatus according to claim 2, wherein the evidence data comprises a cryptographic signature associated with the attester circuitry.

6. An apparatus according to claim 1, wherein the attester circuitry is implemented within the same physical device as the apparatus.

7. An apparatus according to claim 6, wherein the attester circuitry implements a trusted execution environment.

8. An apparatus according to claim 1, comprising fourth interface circuitry to communicate with software authority circuitry, wherein the fourth interface circuitry is configured to:
transmit at least one of the evidence data and the attestation result data to the software authority circuitry;
receive, from the software authority circuitry, security policy result data indicative of a confirmation that said at least one of the evidence data and the attestation result data satisfies a security policy,
wherein the first interface circuitry is configured to perform said transmitting of the attestation result data to the relying party circuitry responsive to said receiving of the security policy result data.

9. An apparatus according to claim 1, wherein:
the second interface circuitry is configured to receive, from the attester circuitry, software authorisation data associated with said processing operation, the software authorisation data comprising a cryptographic signature associated with a software authority.

10. A method comprising:
transmitting, from relying party circuitry, via relay circuitry, to attester circuitry, an attestation request in respect of a processing operation to be performed by the relying party circuitry;
transmitting, from attester circuitry, via the relay circuitry, to verifier circuitry, evidence data associated with the processing operation; and
transmitting, from the verifier circuitry, via the relay circuitry, to the relying party circuitry, attestation result data indicative of a verification of the evidence data.

11. A method according to claim 10, comprising determining, by the attester circuitry, the evidence data.

12. A method according to claim 11, comprising cryptographically signing, by the attester circuitry, the evidence data.

13. A method according to claim 10, comprising, by the verifier circuitry:
verifying the evidence data; and
responsive to said verifying, determining the attestation result data.

14. A method according to claim 13, wherein verifying the evidence data comprises confirming, based on the evidence data, that the processing operation satisfies a security policy.

15. A method according to claim 13, wherein determining the attestation result data comprises cryptographically signing the attestation result data.

16. A method according to claim 10, comprising, by the relying party circuitry:
confirming the attestation result data; and
responsive to said confirming, performing the processing operation.

17. A method according to claim 16, wherein confirming the attestation result data comprises confirming that the attestation result data matches expected attestation result data.

18. An apparatus comprising:
first interface circuitry to communicate with relying party circuitry, the first interface circuitry being configured to receive, from the relying party circuitry, an attestation request in respect of a processing operation to be performed by the relying party circuitry;
evidence determination circuitry to:
receive the attestation request from the first interface circuitry; and
determine, in response to the attestation request, evidence data associated with the processing operation, and
second interface circuitry to communicate with verifier circuitry, the second interface circuitry being configured to:
transmit the evidence data to the verifier circuitry; and
receive, from the verifier circuitry, attestation result data indicative of a verification of the evidence data,
wherein the first interface circuitry is configured to transmit the attestation result data to the relying party circuitry.

19. An apparatus according to claim 18, comprising third interface circuitry to communicate with software authority circuitry, wherein:
the third interface circuitry is configured to:
transmit at least one of the evidence data and the attestation result data to the software authority circuitry;
receive, from the software authority circuitry, security policy result data indicative of a confirmation that said at least one of the evidence data and the attestation result data satisfies a security policy,
wherein the first interface circuitry is configured to perform said transmitting of the attestation result data to the relying party circuitry responsive to said receiving of the security policy result data.

20. An apparatus according to claim 19, wherein the evidence determination circuitry is configured to:
receive, from software authority circuitry, authorisation data associated with a trusted application to be executed by the evidence determination circuitry;
use the trusted application to perform said determining of the evidence data, and
wherein the first interface circuitry is configured to transmit said authorisation data, with the attestation result data, to the relying party circuitry.

* * * * *